(12) United States Patent
Seip et al.

(10) Patent No.: US 6,777,470 B2
(45) Date of Patent: Aug. 17, 2004

(54) POLYOLEFIN ADDITIVE PACKAGES FOR PRODUCING ARTICLES WITH ENHANCED STAIN RESISTANCE

(75) Inventors: Steven David Seip, Pittsburgh, PA (US); Sharon Edwards Thompson, Pittsburgh, PA (US); Edwin B. Townsend, IV, New Kensington, PA (US)

(73) Assignee: Sunoco, Inc. (R&M), Philadelphia, PA (US)

( * ) Notice: Subject to any disclaimer, the term of this patent is extended or adjusted under 35 U.S.C. 154(b) by 261 days.

(21) Appl. No.: 09/867,198

(22) Filed: May 29, 2001

(65) Prior Publication Data

US 2003/0060543 A1 Mar. 27, 2003

(51) Int. Cl.$^7$ ................................................. C08L 5/17
(52) U.S. Cl. ..................... 524/236; 524/86; 524/437; 524/445; 524/303; 524/107; 524/582
(58) Field of Search ............................ 524/86, 97, 99, 524/102, 186, 100, 94, 95, 87, 109, 111, 450, 442, 394, 437, 413, 284

(56) References Cited

U.S. PATENT DOCUMENTS

| | | | | |
|---|---|---|---|---|
| 3,449,257 A | * | 6/1969 | Tuite et al. | 252/301.2 |
| 4,582,785 A | * | 4/1986 | Woodward et al. | 430/538 |
| 4,675,356 A | * | 6/1987 | Miyata | 524/424 |
| 4,859,539 A | * | 8/1989 | Tomko et al. | 42/512 |
| 5,213,888 A | * | 5/1993 | Kubbota et al. | 428/328 |
| 5,278,210 A | * | 1/1994 | Morini et al. | 524/100 |
| 5,310,771 A | * | 5/1994 | Walters | 524/100 |
| 5,338,853 A | * | 8/1994 | MacLeay et al. | 546/224 |
| 5,405,880 A | * | 4/1995 | Kimura et al. | 523/126 |
| 5,412,024 A | * | 5/1995 | Okada et al. | 524/577 |
| 5,744,535 A | * | 4/1998 | Akagawa et al. | 524/451 |
| 5,844,029 A | | 12/1998 | Prabhu et al. | |
| 5,880,191 A | | 3/1999 | Prabhu et al. | |
| 6,051,164 A | * | 4/2000 | Samuels | 252/404 |
| 6,090,877 A | | 7/2000 | Bheda et al. | |
| 6,103,798 A | * | 8/2000 | Prabhu et al. | 524/236 |
| 6,107,377 A | * | 8/2000 | Nakamura et al. | 524/153 |
| 6,146,574 A | | 11/2000 | Henkee et al. | |
| 6,172,153 B1 | * | 1/2001 | Starsinic | 524/400 |
| 6,312,822 B1 | * | 11/2001 | Irick, Jr. et al. | 428/479.6 |

FOREIGN PATENT DOCUMENTS

| | | | | |
|---|---|---|---|---|
| EP | 0 323 409 A2 | | 7/1989 | |
| EP | 0 690 094 A1 | | 1/1996 | |
| EP | 0 867 467 A1 | * | 9/1998 | ............ C08K/5/00 |
| EP | 1 170 329 A1 | | 1/2002 | |
| JP | 48-103642 A | * | 12/1973 | ............ C08K/3/34 |

OTHER PUBLICATIONS

Ciba Specialty Chemicals Brochure, IRGANOX 1076–Phenolic Primary Antioxidant for Processing and Long–Term Thermal Stabilization, Oct. 1999.

Ciba Specialty Chemicals Brochure, UVITEX OB–Fluorescent Whitening Agent, Nov. 1999.

Ciba Specialty Chemicals Brochure, CHIMASSORB 119 FL– Monomeric Hindered Amine Light Stabilizer (HALS), Nov. 1999.

Ciba Specialty Chemicals Brochure, CHIMASSORB 944–Oligomeric Hindered Amine Light Stabilizer (HALS), Nov. 1999.

Ciba Specialty Chemicals Brochure, CHIMASSORB 2020–Block Oligomeric Hindered Amine Light Stabilizer, Jan. 2001.

Ciba Specialty Chemicals Brochure, TINUVIN 111–Synergistic Mixture of Monomeric and Oligomeric Hindered Amine Stabilizer, Nov. 1999.

Ciba Specialty Chemicals Brochure, TINUVIN 234–Low Volatile Benzotriazole UV Absorber.

Ciba Specialty Chemicals Brochure, TINUVIN 326–Benzotriazole UV Absorber.

Ciba Specialty Chemicals Brochure, TINUVIN 327–Red–Shifted Benzotriazole UV Absorber, Oct. 1997.

Ciba Specialty Chemicals Brochure, TINUVIN 328–Benzotriazole UV Absorber, Oct. 1997.

Ciba Specialty Chemicals Brochure, TINUVIN 622–Oligomeric Hindered Amine Light Stabilizer (HALS), Nov. 1999.

Ciba Specialty Chemicals Brochure, TINUVIN 770–Low Molecular Weight Hindered Amine Light Stabilizier (HALS), Nov. 1999.

Ciba Specialty Chemicals Brochure, TINUVIN 783–Synergistic Mixture of Oligomeric Hindered Amine Stabilizers, Nov. 1999.

Ciba Specialty Chemicals Brochure, TINUVIN 791–Synergistic Mixture of Oligomeric Hindered Amine Stabilizers, Nov. 1999.

"Recent Advances in the Phenol Free Stabilization of Polypropylene Fiber" A Pathway to Consistent Maintenance of Low Color Under Harsh Conditions, R.E. King III, Ph.D., Ciba Specialty Chemicals, SPE Polyolefins RETEC, Feb. 2001, Houston, TX, pp. 501–519, 542.

* cited by examiner

Primary Examiner—David W. Wu
Assistant Examiner—Rip A. Lee
(74) Attorney, Agent, or Firm—Robert A. Koons, Jr.; Matthew P. McWilliams; Buchanan Ingersoll P.C.

(57) ABSTRACT

The present invention provides additive packages for polyolefins The additive packages of the present invention comprise at least one non-phenolic antioxidant and a hindered amine light stabilizer. The additive packages may contain other additives as needed, and may optionally include an acid scavenger. Articles made from the resultant polymers, such as radiator surge tanks, exhibit enhanced stain and discoloration resistance upon exposure to high temperatures and harsh chemicals such as those experienced in "under the hood" spaces of modern automobiles.

28 Claims, 4 Drawing Sheets

FIGURE 2: G0-5 COOLANT TESTING
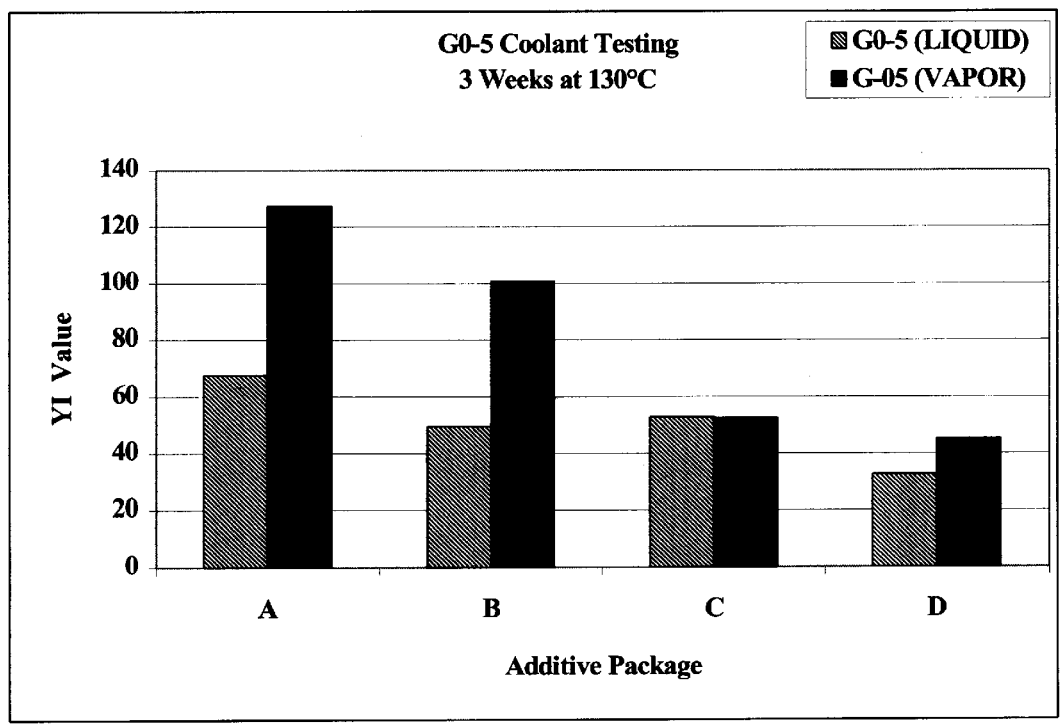

FIGURE 3: DEX-COOL® COOLANT TESTING
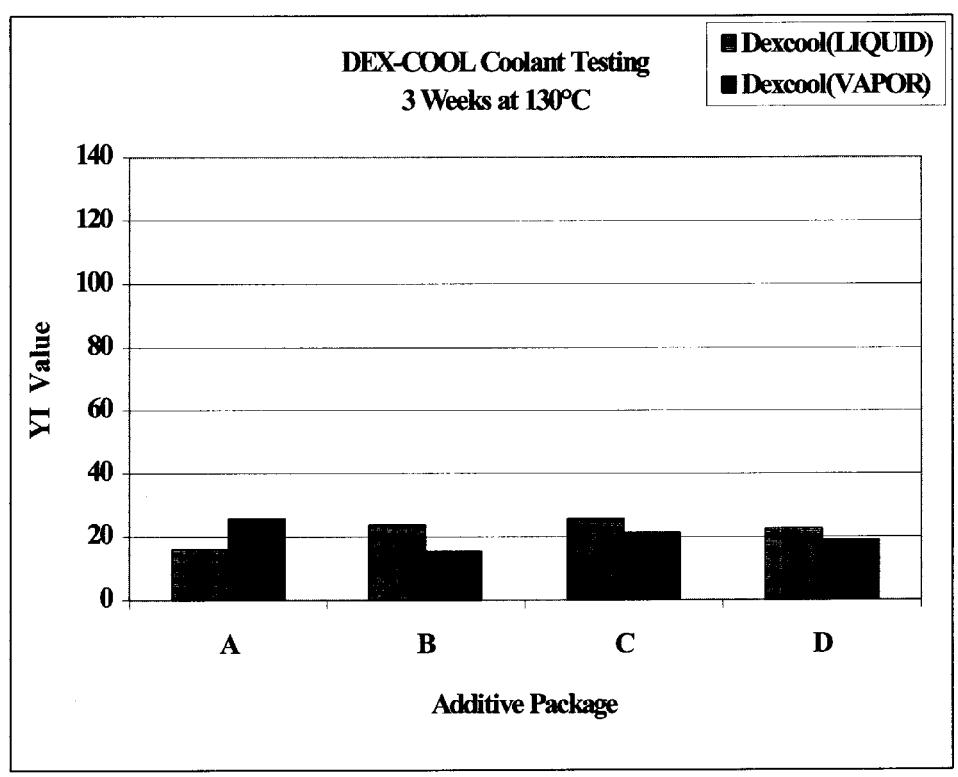

FIGURE 4: PRESTONE COOLANT TESTING
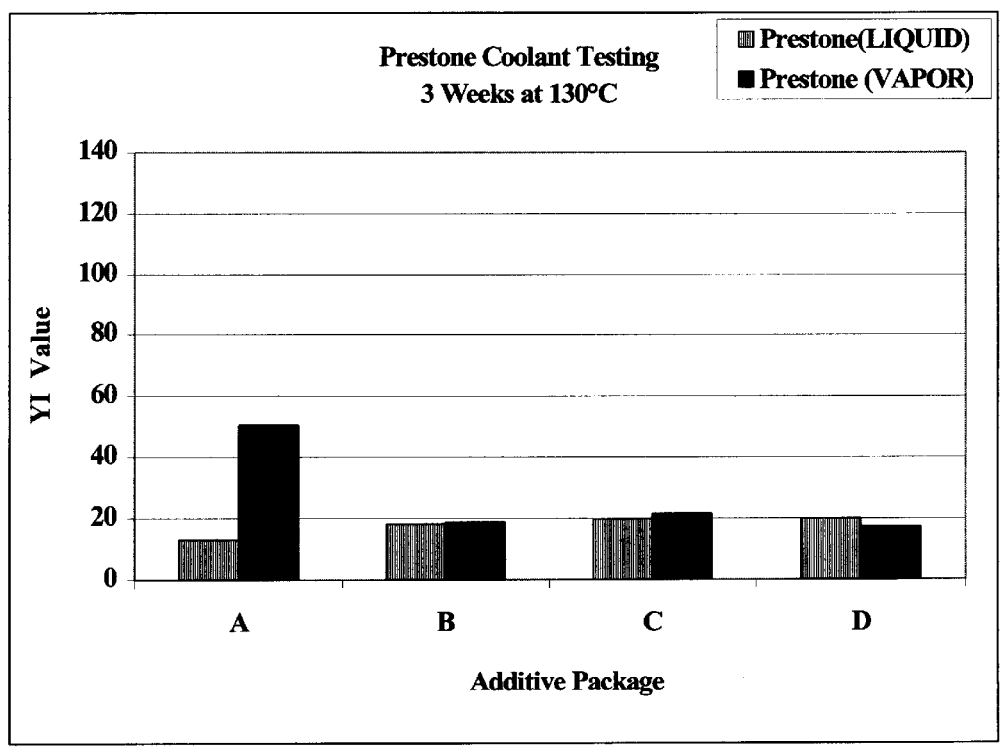

POLYOLEFIN ADDITIVE PACKAGES FOR PRODUCING ARTICLES WITH ENHANCED STAIN RESISTANCE

FIELD OF THE INVENTION

The present invention relates in general to polyolefins, and more specifically to additive packages for polyolefins. The polyolefins made with these additive packages can be used to form articles which will exhibit an enhanced stain and discoloration resistance upon exposure to high temperature and harsh chemical conditions.

BACKGROUND OF THE INVENTION

Pressurized automobile engine radiator overflow bottles, known as surge tanks, have been molded from polyolefins such as polypropylene for about the past ten to twelve years. These surge tanks were designed for use with traditional (inorganic) engine coolants, such as Prestone® and to exposure to reasonable pressures and temperatures. The general composition of Prestone® fluid, according to the manufacturer is ethylene glycol, diethylene glycol and water. Newer engine coolants such as Valvoline® G0-5 and Texaco® DEX-COOL® have been developed for longer use. The general composition of G0-5 coolant is ethylene glycol, diethylene glycol, and sodium tetraborate pentahydrate. According to its manufacturer, DEX-COOL® coolant contains 1,2-ethanediol, 2-ethyl hexanoic acid, and potassium hydroxide.

Because today's more aerodynamic automobile designs allow less airflow through the "under the hood" space of the vehicles, the temperatures to which the surge tank is exposed have increased dramatically. These higher temperatures, coupled with the use of the newer engine coolants listed above can produce a much harsher environment for the surge tank. This harsh environment has resulted in greater discoloration and staining of the polymer from which the tank is made.

Automobile manufacturers in general and surge tank suppliers in particular were at first unconcerned about discoloration. However, as the sales volume of polyolefin surge tanks has increased, consumers have increasingly noticed and expressed concern about this discoloration. The consumers believe, falsely, that the polymer has somehow degraded. As engine coolant technology is evolving, new longer life (hybrid/organic) fluids are being developed for automobile engine radiator systems. Those new fluids will likely produce even greater degrees of discoloration on polyolefin parts such as surge tanks, and will further increase consumer concerns.

It should be noted that there are two types of discoloration of concern to the present invention:

(1) surface staining due to direct contact of the polymer with harsh chemicals such as automobile engine coolant; and (2) discoloration caused by exposure to heat such as that experienced in the "under the hood" region of modern automobiles.

Traditionally, polyolefin manufacturers have included phenolic antioxidant additives such as pentaerythritol tetrakis(3-(3,5-di-tert-butyl-4-hydroxyphenyl)propionate) (Irganox® 1010, Ciba) and octadecyl-3-(3,5-di-tert-butyl-4-hydroxyphenyl)-propionate (Irganox® 1076, Ciba), to stabilize and protect the polymer. However, phenolic antioxidants permit the finished part to experience an unacceptable level of discoloration when subjected to higher temperatures as in today's automobile engine and exposed to harsh chemicals such as the newer engine coolants, thereby leading to the above-mentioned consumer doubts about the integrity of products made from the polymers.

U.S. Pat. Nos. 5,844,029, 5,880,191 and 6,013,798 all describe thermoplastic resin compositions and methods of making them, wherein the compositions contain at least a saturated hydrocarbon amine oxide. Also disclosed are stabilizer compositions which contain at least a saturated hydrocarbon amine oxide and a second stabilizer. U.S. Pat. No. 5,844,029 describes the thermoplastic resin composition as containing only a saturated hydrocarbon amine oxide as a first component and cols. 5–8 list a wide variety of optionally included ingredients without any direction as to methods of choosing a particular ingredient from among those listed. No mention is made of using any other non-phenolic antioxidant in place of the saturated amine oxide. Further, no mention is made of using the thermoplastic resin to form articles which will be subjected to harsh temperature and chemical conditions.

U.S. Pat. No. 6,090,877 discloses low smoke forming, acid-neutralized polypropylene compositions comprising a polypropylene polymer and an acid scavenging amount of mono potassium citrate. The compositions of U.S. Pat. No. 6,090,877 are formulated so as to reduce clogging or obstruction of a screen pack that filters molten polymer during extrusion. As in U.S. Pat. No. 5,844,029, a long list of potential additives is given without any guidance as to selection criteria. No other acid scavengers are described. Also, no mention is made of using the compositions to form articles which will be exposed to harsh temperature and chemical conditions.

U.S. Pat. No. 6,146,574 describes a blend of polyolefin with the reaction of a functionalized polyolefin and a polyetheramine wherein the polyetheramine is grafted to the functionalized polyolefin. The polyetheramine helps the compositions retain dye or paint color. The compositions are especially useful for making fibers and may be used to make paintable automotive body parts.

U.S. Pat. No. 6,172,153 describes a polymer composition and fiber, film and fabric prepared therefrom. The compositions described in the examples all contain the conventional phenolic antioxidant Irganox® 1076.

Consequently, there is a need in the art for additive packages for polyolefins which will provide color stability in the resultant product without sacrificing polymer stability. The present invention provides such polyolefin additive packages, which will yield polymers having enhanced stain and discoloration resistance upon exposure to higher temperatures such as those experienced in automobile engines, and harsh chemicals such as long-life radiator coolants.

SUMMARY OF THE INVENTION

The present invention provides a polyolefin additive package comprising, about 0.025% to about 1% of at least one non-phenolic antioxidant and about 0.025% to about 1% of a hindered amine light stabilizer.

The present invention further provides an article comprising, a polyolefin and an additive package comprising 0.025% to 1% of at least one non-phenolic antioxidant and 0.025% to 1% of a hindered amine light stabilizer, wherein the article exhibits enhanced discoloration resistance upon exposure to high temperature and harsh chemical conditions.

The present invention also provides a method of enhancing discoloration resistance in an article, the method comprising, combining at least one olefin with an additive package to make a mixture, the additive package comprising about 0.025% to about 1% of at least one non-phenolic antioxidant and about 0.025% to about 1% of a hindered amine light stabilizer, polymerizing the mixture to make a polyolefin and forming the polyolefin into an article, wherein the article exhibits enhanced discoloration resistance upon exposure to high temperature and harsh chemical conditions.

The present invention yet further provides a method of making an automobile surge tank with enhanced discoloration resistance, the method comprising, combining propylene with an additive package to make a mixture, the additive package comprising about 0.025% to about 1% of at least one non-phenolic antioxidant and about 0.025% to about 1% of a hindered amine light stabilizer, polymerizing the mixture to make polypropylene, and forming the polypropylene into an automobile surge tank, wherein the automobile surge tank exhibits enhanced discoloration resistance upon exposure to high temperature and harsh chemical conditions.

These and other advantages and benefits of the present invention will be apparent from the Detailed Description of the Invention herein below.

BRIEF DESCRIPTION OF THE FIGURES

The present invention will now be described for the purpose of illustration and not limitation in conjunction with the following figures wherein:

FIG. 2 illustrates polypropylene plaque exposure testing in Valvoline® G0-5 coolant;

FIG. 3 illustrates polypropylene plaque exposure testing in Texaco® DEX-COOL® coolant; and FIG. 4 illustrates polypropylene plaque exposure testing in Prestone® coolant.

DETAILED DESCRIPTION OF THE INVENTION

Figure 1:
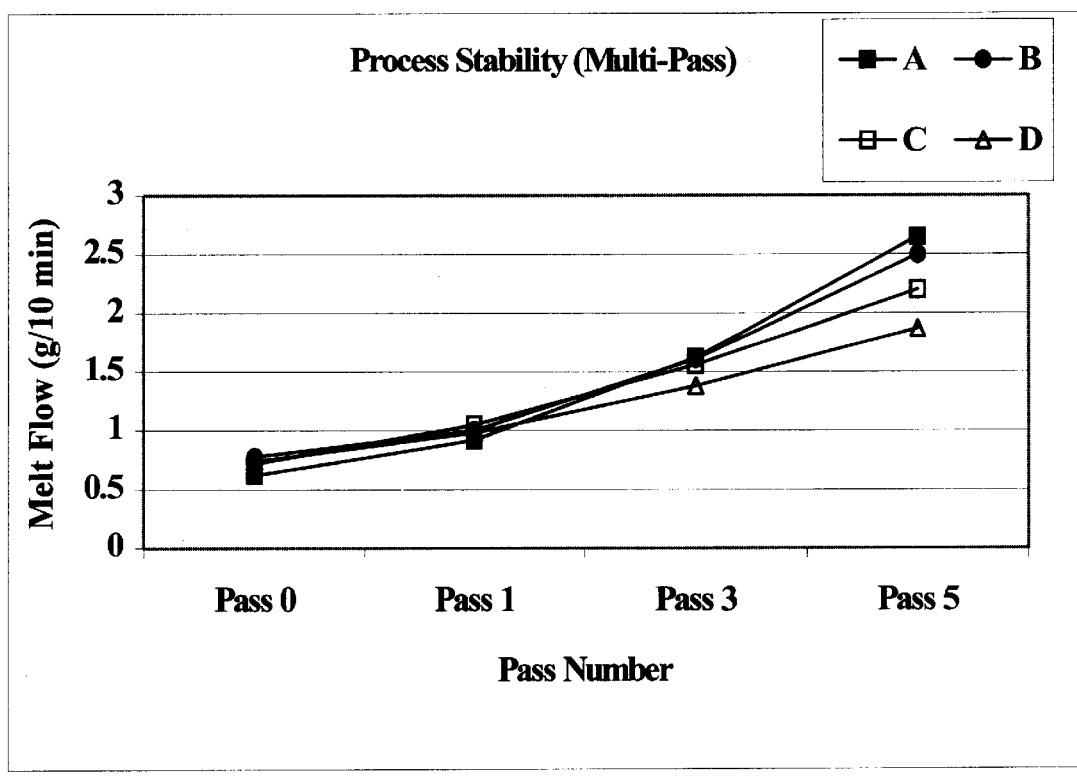
FIG. 1 compares the multi-pass extrusion stability of polypropylene containing additive packages of the present invention with that of polypropylene containing conventional phenolic additives.

The term "automobile" generally refers to passenger vehicles such as cars, vans, mini-vans and sport utility vehicles, but unless otherwise specified herein is also meant to include such vehicles as trucks, buses and tractors.

As used herein, the term "polyolefin" generally means but is not limited to, homopolymers, copolymers, such as, for example, block, graft, impact, random and alternating copolymers, terpolymers, etc., and blends and modifications thereof. Comonomers useful in the present invention include, but are not limited to α-olefins ranging from $C_2$ up to about $C_{12}$. Furthermore, unless otherwise specifically limited, the term "polyolefin" includes all possible geometrical configurations of the material. Those configurations include, but are not limited to, isotactic, syndiotactic, and atactic symmetries. Some possible examples of polyolefins useful in the present invention include, but are not limited to, polyethylene, polypropylene, polystyrene and mixtures thereof.

The additive packages of the present invention comprise about 0.025% to about 1% of at least one non-phenolic antioxidant and about 0.025% to about 1% of a hindered amine light stabilizer. One class of non-phenolic antioxidant useful in the additive packages of the present invention are amine oxides, more preferably dialkyl amine oxides and most preferably dialkyl methyl amine oxides. A particularly preferred dialkyl methyl amine oxide, structure shown below:

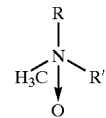

(wherein R,R'=$C_{14}$–$C_{22}$) is commercially available from GE Specialty Chemicals under the tradename Genox.

Hydroxyl amines are a second preferred type of non-phenolic antioxidant for use in the additive packages of the present invention. A particularly preferred hydroxyl amine is available from Ciba Specialty Chemicals under the tradename FS-042 and its structure is shown below:

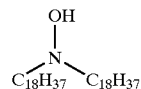

A particularly preferred hindered amine light stabilizer (HALS) in the additive packages of the present invention is 1,3,5-triazine-2,4,6-triamine,N,N'''-[1,2-ethane-diyl-bis [[[4,6-bis-[butyl 91,2,2,6,7-pentamethyl-4-piperdinylamino]-1,3,5-triazine-2-yl]imino]-3,1-propanediyl]]bis [N',N''-dibutyl-N',N''-bis(1,2,2,6,6-pentamethyl-4-piperdinyl)-commercially available as Chimassorb® 119 from Ciba Specialty Chemicals. Other HALS useful in the additive packages of the present invention include, but are not limited to: bis-(1-octyloxy-2,2,6,6 tetramethyl-4-piperdinyl) sebacate; 2-(2H-benzotriazol-2-yl)-4,6-bis(1-methyl-1-phenylethyl)phenol; 2-(5-chloro-2H-benzotriazol-2-yl)6-(1,1-dymethlethil)-4-methylphenol; 2-(3',5'-di-tert-butyl-2'-hydroxyphenyl)-5-chlorobenzotriazole; 2-(2H-benzotiazol-2-yl)-4,6-bis(1,1-dimethylpropyl)phenol; dimethyl succinate polymer with 4-hydroxy-2,2,6,6-tetramethyl-1-piperidineethanol; bis(2,2, 6,6-tetramethyl-4-piperdinyl) sebacate; poly [(6-[(1,1,3,3-tetramethyl butyl) amino]-s-triazine-2,4-diyl][[(2,2,6,6-tetramethyl-4-piperidyl) imino]hexamethylene [(2,2,6,6-tetramethyl-4-piperidyl) iaimno]]; 1,6-hexanediamine, N,N'-bis(2,2,6,6-tetramethyl-4-piperidnyl)-polymer with 2,4,6-trichloro-1,3,5-triazine reaction products with N-butyl-1-butanamine and N-butyl-2,2,6,6-tetramethyl-4-piperidinamine; all of which are commercially available. The above-listed HALS can be used individually or in various mixtures thereof.

Acid scavengers may optionally be included in the additive packages of the present invention. Such acid scavengers preferably can comprise about 0.01% to about 0.5% by weight of the polyolefin-additive package mixture and include, but are not limited to, hydrotalcite, aluminum hydroxide, zinc carbonate, zinc hydroxide and mixtures thereof. A particularly preferred acid scavenger comprises a mixture of aluminum hydroxide, zinc carbonate and zinc hydroxide and is available under the tradename ZHT-4D from Kyowa Chemical Industry Co., Ltd. Another preferred acid scavenger is a hydrotalcite available under the tradename DHT also available from Kyowa Chemical. A third preferred acid scavenger is octadecanoic acid calcium salt that is sold under the trade name calcium stearate by Witco. These acid scavengers may be used alone or in various combinations thereof.

Other additives, as commonly used in the art, can also be included as needed. For example, distearyl 3,3- thiodipropionate, available under the trade name DSTDP, and/or dilauryl 3,3-thiodipropionate, trade name DLTDP, both available from Struktol Company of America, can serve as long term heat aging additive(s). A fluorescent whitening agent, 2,2'-(2,5-thiophenediyl) bis (5-tert-butylbenzoxazole), commercially available as Uvitex®OB from Ciba Specialty Chemicals, can also be useful in the additive packages of the present invention.

The present invention will now be described for the purposes of illustration and not limitation by reference to the following examples.

The compositions of the additive packages tested are given in Table I. Additive packages A and B contained a traditional phenolic antioxidant with additive package B having an optimized level of the phenolic antioxidant. Additive packages of the present invention, C and D, had as the non-phenolic antioxidant, an amine oxide and a hydroxyl amine respectively. Additive packages C and D also included a hindered amine light stabilizer.

antioxidant) and in Comparative Example 2, a polypropylene made with an optimized phenolic antioxidant additive package B were subjected to the multi-pass extrusion test and the results are illustrated in FIG. 1. As can be seen from reference to FIG. 1 and Table II, polypropylenes made with additive packages A or B had an initial melt flow rate of 0.62 or 0.78 g/10 min. respectively, which rose to at least 2.5 g/10 min. after five passes through the extruder.

EXAMPLES 3 AND 4

Polypropylenes made with additive packages of the present invention were also subjected to the multi-pass extrusion test. In Example 3, additive package C was used which contained an amine oxide, and in Example 4, additive package D was used which contained a hydroxyl amine. Both additive packages also contained a hindered amine light stabilizer. As can again be seen from reference to FIG. 1 and Table II, polypropylenes made with additive packages C or D began the test with an initial melt flow rate of 0.72 or 0.74 g/10 min. respectively. The melt flow rate rose to about 2 g/10 min. after five passes through the extruder. Therefore, the process stability of polypropylenes made with additive packages of the present invention compares quite favorably with that of polypropylenes made with the conventional additive packages exemplified by A and B.

TABLE I

| Additive Package A (% additive) | Additive Package B (% additive) | Additive Package C (% additive) | Additive Package D (% additive) | Additive | Additive type |
|---|---|---|---|---|---|
| — | — | 0.2 | — | Genox | Non-phenolic Antioxidant |
| — | — | — | 0.2 | FS-042 | Non-phenolic Antioxidant |
| — | — | 0.2 | 0.2 | Chimasorb ® 119 | HALS |
| — | — | 0.06 | 0.06 | ZHT | Acid Scavenger |
| 0.09 | 0.07 | — | — | Ultranox ® 626 | Secondary Antioxidant |
| — | 0.02 | — | — | DHT | Acid Scavenger |
| 0.1 | — | — | — | BHT | Phenolic Primary Antioxidant |
| 0.15 | 0.4 | — | — | DSTDP | Long Term Heat Aging Antioxidant |
| 0.1 | 0.08 | — | — | Irganox ® 1010 | Phenolic Primary Antioxidant |
| 0.05 | — | — | — | Pationic 1240 | Acid Scavenger |
| 0.05 | — | — | — | Pationic 940 | Acid Scavenger |
| 0.01 | — | — | — | Irganox ® 1076/76 | Phenolic Primary Antioxidant |
| — | 0.06 | — | — | Calcium Stearate | Acid Scavenger |

MULTI-PASS EXTRUSION TEST

COMPARATIVE EXAMPLES 1 AND 2

Multi-pass extrusion data gives an indication of a material's stability in process because it measures the changes in melt flow rate (MFR) over the course of five passes through an extruder. Multi-pass extrusion is a test which can mimic the processing of a material in parts manufacturing. Briefly, the material was run through an extruder five times, at a nominal temperature of about 490° F. (254.4° C.). A small amount of material was collected before the first pass and after the first, third and fifth pass, and its melt flow rate measured by ASTM D1238. Significant changes in melt flow rate over the course of five passes are indicative of an increased amount of polymer degradation, therefore, small changes in melt flow rate over the course of five passes indicate good process stability.

In Comparative Example 1, a polypropylene made with additive package A (i.e., the conventional phenolic

TABLE II

| Additive Package | Initial MFR (g/10 min.) | Pass One MFR (g/10 min.) | Pass Three MFR (g/10 min.) | Pass Five MFR (g/10 min.) |
|---|---|---|---|---|
| A | 0.62 | 0.92 | 1.62 | 2.65 |
| B | 0.78 | 1.0 | 1.61 | 2.5 |
| C | 0.72 | 1.05 | 1.56 | 2.2 |
| D | 0.74 | 0.98 | 1.38 | 1.87 |

EXAMPLES 5–7 COOLANT EXPOSURE TESTS

The inventors developed a coolant exposure test to evaluate the amount of discoloration that products formed from polyolefins made with the additive packages of the present invention will demonstrate in a high temperature environment and in the presence of harsh chemicals such as radiator coolants. Briefly, in the coolant exposure test, injection molded test plaques of polypropylene made with the additive package as noted were placed in pressure vessels. The vessels were half-filled with the particular radiator coolant as noted and the plaques were aged in the vessels for 3 weeks at 266° F. (130° C.). This test simultaneously simulated the polymer's exposure to both the liquid space and the vapor space in a surge tank. Therefore, the results showed discoloration on the test plaques resulting from both the liquid and vapor phase of the coolant.

Valvoline® G0-5 antifreeze coolant was used in Example 5. According to the manufacturer, the composition of G0-5 coolant was 89% ethylene glycol, 0–10% diethylene glycol, and 0–7% of sodium tetraborate pentahydrate. The data from Example 5 are summarized in Table III and illustrated in FIG. 2. Because G0-5 coolant subjected the plaques to the harshest conditions of any of the three tested coolants, it was the most likely to cause polymer staining and/or discoloration.

As will be apparent from reference to Table III and FIG. 2, polypropylenes made with additive packages of the present invention, C and D, demonstrated a much lower amount of discoloration, as measured by yellowness index (YI), in the presence of G0-5 fluid and vapor than did polypropylenes made with additive packages A and B, which included the conventional phenolic antioxidant.

TABLE III

| Additive Package | G0-5 vapor Yellowness Index (YI) Value | G0-5 liquid Yellowness Index (YI) Value |
|---|---|---|
| A | 127.44 | 67.91 |
| B | 100.80 | 49.51 |
| C | 52.61 | 52.91 |
| D | 45.14 | 32.60 |

Texaco® DEX-COOL® antifreeze coolant was used in Example 6. The general composition of DEX-COOL® coolant was 80–95% 1,2 ethanediol, 3–10% 2-ethyl hexanoic acid, and 1–3% potassium hydroxide. The data from Example 6 are summarized in Table IV and illustrated in FIG. 3.

TABLE IV

| Additive Package | DEX-COOL ® vapor Yellowness Index (YI) Value | DEX-COOL ® liquid Yellowness Index (YI) Value |
|---|---|---|
| A | 25.83 | 16.12 |
| B | 15.38 | 23.83 |
| C | 21.45 | 25.72 |
| D | 18.97 | 22.57 |

Allied Signal Prestone® antifreeze coolant was used in Example 7. The general composition of Prestone® fluid used was ethylene gycol, diethylene glycol and water. The data from Example 7 are summarized in Table V and illustrated in FIG. 4.

TABLE V

| Additive Package | Prestone ® liquid Yellowness Index (YI) Value | Prestone ® vapor Yellowness Index (YI) Value |
|---|---|---|
| A | 50.47 | 13.26 |
| B | 18.88 | 18.23 |
| C | 21.51 | 19.85 |
| D | 17.42 | 20.07 |

As can be seen from reference to Tables IV and V (and FIGS. 3 and 4), polypropylenes made with additive packages C and D also showed comparable levels of discoloration, as measured by yellowness index (YI), to a polypropylene containing an optimized phenolic antioxidant (additive package B) in both the vapor and liquid phases of the more traditional DEX-COOL® (Table IV, FIG. 3) and Prestone® (Table V, FIG. 4) coolants.

It should be noted that according to the manufacturers, all of the above-listed coolants contained numerous other stabilizers and additives in amounts less than 1%.

The foregoing illustrations of embodiments of the present invention are offered for the purposes of illustration and not limitation. It will be readily apparent to those skilled in the art that the embodiments described herein may be modified or revised in various ways without departing from the spirit and scope of the invention. The scope of the invention is to be measured by the appended claims.

We claim:

1. An under the hood automobile component exhibiting enhanced stain resistance upon exposure to high temperature and harsh chemical conditions, said under the hood automobile component comprising:

at least one polyolefin selected from the group consisting of: propylene homopolymers, propylene impact copolymers and mixtures thereof;

said at least one polyolefin being stabilized with an additive package comprising 0.025% to 1% of at least one non-phenolic antioxidant by weight based on the weight of said at least one polyolefin and 0.025% to 1% of a hindered amine light stabilizer by weight based on the weight of said at least one polyolefin.

2. The under the hood automobile component of claim 1, wherein said non-phenolic antioxidant comprises an amine oxide.

3. The under the hood automobile component of claim 2, wherein said amine oxide comprises a dialkyl methyl amine oxide of the general formula,

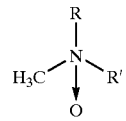

wherein
substituent R comprises from 14 to 22 carbon atoms and substituent R' comprises from 14 to 22 carbon atoms.

4. The under the hood automobile component of claim 1 wherein said non-phenolic antioxidant comprises a hydroxyl amine.

5. The under the hood automobile component of claim 4, wherein said hydroxyl amine is of the formula:

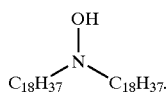

6. The under the hood automobile component of claim 1, wherein said hindered amine light stabilizer is 1,3,5-triazine-2,4,6-triamine,N,N'''-[1,2-ethane-diyl-bis [[[4,6-bis-[butyl 1,2,2,6,7-pentamethyl-4-piperdinylamino]-1,3,5-triazine-2-yl]imino]-3,1-propanediyl]]bis [N',N''-dibutyl-N',N''-bis(1,2,2,6,6-pentamethyl-4-piperdinyl.

7. The under the hood automobile component of claim 1, wherein said hindered amine light stabilizer is a member selected from the group consisting of bis-(1-octyloxy-2,2,6,6 tetramethyl-4-piperdinyl) sebacate, 2-(2H-benzotriazol-2-yl)-4,6-bis(1-methyl-1-phenylethyl)phenol, 2-(5-chloro-2H-benzotriazol-2-yl)6-(1,1-dimethlethyl)-4-methylphenol, 2-(2',4'-di-tert-butyl-2'-hydroxyphenyl)-5-chlorobenzotriazole, 2-(2H-benzotriazol-2-yl)-4,6-bis(1,1-dimelhylpropyl)phenol, dimethyl succinate polymer with 4-hydroxy-2,2,6,6-tetramethyl-1-piperidineethanol, bis(2,2,6,6-tetramethyl-4-piperidinyl) sebacate, poly ](6-[(1,1,3,3-tetramethyl butyl) amino]-s-triazine-2,4-diyl][[(2,2,6,6-tetramethyl-4-piperidyl) imino]hexamethylene [(2,2,6,6-tetramethyl-4-piperidyl) imino]], 1,6-hexanediamine, N,N'-bis(2,2,6,6-tetramethyl-4-piperidinyl)-polymer with 2,4,6-trichloro-1,3,5-triazine reaction products with N-butyl-1-butanamine and N-butyl-2,2,6,6-tetramethyl-4-piperidinamine and mixtures thereof.

8. The under the hood automobile component of claim 1 further including 2,5-thiophenediyl bis(5-tert-butyl-1,3-benzoxazole).

9. The under the hood automobile component of claim 1, wherein said additive package further comprises about 0.01% to about 0.5% of an acid scavenger by weight based on the weight of said polyolefin.

10. The under the hood automobile component of claim 9, wherein said acid scavenger is a member selected from the group consisting of aluminum hydroxide, zinc carbonate, zinc hydroxide, hydrotalcite and mixtures thereof.

11. The under the hood automobile component of claim 9, wherein said acid scavenger comprises a mixture of aluminum hydroxide, zinc carbonate, zinc hydroxide.

12. The under the hood automobile component of claim 9, wherein said acid scavenger comprises hydrotalcite.

13. The under the hood automobile component of claim 9, wherein said acid scavenger comprises octadecanoic acid calcium salt.

14. The under the hood automobile component of claim 1, wherein said at least one polyolefin further contains distearyl 3,3-thiodipropionate.

15. The under the hood automobile component of claim 1, wherein said at least one polyolefin further contains dilauryl 3,3-thiodipropionate.

16. The under the hood automobile component of claim 1, wherein said under the hood automobile component is an automobile surge tank.

17. A method of improving the stain resistance of an under the hood automobile component on exposure to high temperatures and a harsh chemical environment, wherein said under the hood automobile component comprises a polyolefin, the method comprising:
    stabilizing a polyolefin with an additive package comprising 0.025% to 1% of at least one non-phenolic antioxidant by weight based on the weight of said at least one polyolefin and 0.025% to 1% of a hindered amine light stabilizer by weight based on the weight of said at least one polyolefin;
    wherein said polyolefin is selected from the group consisting of: propylene homopolymers, propylene impact copolymers and mixtures thereof; and
    forming said polyolefin into an automobile component for an under the hood application.

18. The method of claim 17, wherein said non-phenolic antioxidant comprises an amine oxide.

19. The method of claim 18, wherein said amine oxide comprises a dialkyl methyl amine oxide of the general formula,

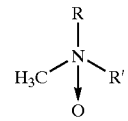

wherein
    substituent R comprises from 14 to 22 carbon atoms and substituent R' comprises from 14 to 22 carbon atoms.

20. The method of claim 17, wherein said non-phenolic antioxidant comprises a hydroxyl amine.

21. The method of claim 20, wherein said hydroxyl amine is of the formula:

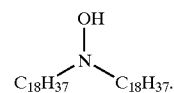

22. The method of claim 17, wherein said hindered amine light stabilizer is 1,3,5-triazine-2,4,6-triamine,N,N'''-[1,2-ethane-diyl-bis-[[[4,6-bis-[butyl 1,2,2,6,7-pentamethyl-4-piperdinylamino]-1,3,5-triazine-2-yl]imino]-3,1-propanediyl]]bis[N',N''-dibutyl-N',N''-bis(1,2,2,6,6-pentamethyl-4-piperdinyl).

23. The method of claim 17, wherein said hindered amino light stabilizer is a member selected from the group consisting of bis-(1-octyloxy-2,2,6,6 tetramethyl-4-piperdinyl) sebacate, 2-(2H-benzotriazol-2-yl)-4,6-bis)1-methyl-1-phenylethyl)phenol, 2-(5-chloro-2H-benzotriazol-2-yl)6-(1,1-dymethlethil)-4-methylphenol, 2-(3',5'-di-tert-butyl-2'-hydroxyphenyl)-5-chlorobenzotriazole, 2-(2H-benzotiazol-2-yl)-4,6-bis(1,1-dimelhylpropyl)phenol, dimethyl succinate polymer with 4-hydroxy-2,2,6,6-tetramethyl-1-piperidineethanol)phenol, dimethyl succinate polymer with 4-hydroxy-2,2,6,6-tetramethyl-1-piperidineethanol, bis(2,2,6,6-tetramethyl-4-piperidinyl) sebacate, poly [(6-[(1,1,3,3-tetramethyl butyl)amino]-s-triazine-2,4-diyl][[(2,2,6,6-tetramethyl-4-piperidyl)imino]hexamethylene [(2,2,6,6-tetramethyl-4-piperidyl) imino]], 1,6-hexanediamine, N,N'-bis(2,2,6,6-tetramethyl-4-piperidinyl)-polymer with 2,4,6-trichloro-1,3,5-triazine reaction products with N-butyl-1-butanamine and N-butyl-2,2,6,6-tetramethyl-4-piperidinamine and mixtures thereof.

24. The method of claim 17, wherein said under the hood automobile component further includes 2,5-thiophenedlylbis(5-tert-butyl-1,3-benzoxazole).

25. The method of claim 17, wherein said additive package further comprises about 0.01% to about 0.5% of an acid scavenger by weight based on the weight of said polyolefin.

26. The method of claim 17, wherein said polyolefin further contains distearyl 3,3-thiodipropionate.

27. The method of claim 17, wherein said polyolefin further contains dilauryl 3,3-thiodipropionate.

28. The method of claim 17, wherein said under the hood automobile component is an automobile surge tank.

* * * * *